United States Patent

Kellner

[11] Patent Number: 5,456,020
[45] Date of Patent: * Oct. 10, 1995

[54] METHOD AND SENSOR FOR THE DETERMINATION OF THE POSITION OF A POSITION-CONTROL ELEMENT RELATIVE TO A REFERENCE BODY

[75] Inventor: Helmut Kellner, Moormerland, Germany

[73] Assignee: E.M.S. Technik GmbH, Leer, Germany

[*] Notice: The portion of the term of this patent subsequent to Apr. 4, 2012 has been disclaimed.

[21] Appl. No.: 78,283

[22] PCT Filed: Nov. 19, 1991

[86] PCT No.: PCT/DE91/00920

§ 371 Date: Aug. 5, 1993

§ 102(e) Date: Aug. 5, 1993

[87] PCT Pub. No.: WO92/11507

PCT Pub. Date: Jul. 9, 1992

[30] Foreign Application Priority Data

Dec. 17, 1990 [DE] Germany .......................... 40 40 794.2

[51] Int. Cl.⁶ .................................................. G01B 11/00
[52] U.S. Cl. ................................................ 33/707; 33/706
[58] Field of Search ............................ 33/702, 706, 707, 33/708; 356/373, 374; 250/237 G

[56] References Cited

U.S. PATENT DOCUMENTS

| 2,875,524 | 3/1959 | Bower et al. ............................. 33/708 |
| 4,461,083 | 7/1984 | Ernst ........................................ 33/707 |
| 4,602,463 | 7/1986 | Ernst ........................................ 33/707 |
| 4,626,100 | 12/1986 | Johnson ................................. 356/152 |
| 4,628,609 | 12/1986 | Rieder ..................................... 33/707 |
| 4,654,527 | 3/1987 | Schmitt ................................... 33/707 |

FOREIGN PATENT DOCUMENTS

| 104762 | 4/1984 | European Pat. Off. . |
| 135673 | 4/1985 | European Pat. Off. . |
| 3840726A1 | 6/1990 | Germany . |
| 3909856A1 | 10/1990 | Germany . |

OTHER PUBLICATIONS

Patent Abstracts of Japan, vol. 11, No. 261, Aug. 25, 1987.

*Primary Examiner*—Thomas B. Will
*Assistant Examiner*—G. Bradley Bennett
*Attorney, Agent, or Firm*—Collard & Roe

[57] ABSTRACT

Described is a method of determining the position of a position-control element relative to a reference body, the position-control element or the reference body carrying a first scale with graduations placed at constant intervals, and the reference body or position-control element having a first scanner which, from an analysis of the graduations and from the angles subtended by the distances between the first scanner location and three graduations on the scale, calculates the coordinates of the first scanner location trigonometrically. In order to make it possible to calculate other coordinates and angles of inclination, the method calls for at least one additional scanner mounted a certain distance from the first scanner. All the coordinates of the scanner locations are processed together, allowing for the distance separating the scanners.

35 Claims, 3 Drawing Sheets

$\varphi = \arctan \dfrac{z_4 - z_3}{\delta_{43}}$

METHOD AND SENSOR FOR THE DETERMINATION OF THE POSITION OF A POSITION-CONTROL ELEMENT RELATIVE TO A REFERENCE BODY

The invention relates to a method for the determination of the position of a position-control element relative to a reference body.

Such a method serves, for example for detecting in the control of measuring and manufacturing machines distances between longitudinally displaceable objects such as measuring heads and gripping or mounting arms. In this connection, the accuracy with which such distances can be determined is of decisive importance for the manufacturing accuracy of the automatic machine.

A method is already known from DE-OS 39 09 856 that permits a high measuring accuracy independently of an exact guidance of the scanner. In this connection, three graduations of a scale are analyzed by a scanner. With two graduations, the angle of projection formed between a scanner location and said graduations would still be dependent upon the distance by which the scanner location is disposed above the graduations, and how far it is displaced laterally. With three graduations, it is possible to exactly determine the scanner location via the additional angle of projection between the scanner location, said additional graduation and one of the other graduations, because for a combination of two angles of combination, only one single location exists in which the scanner location can be.

The invention has as an object the creation of the preconditions which, in addition to measurements of the position on one axis of the scale and perpendicular to the latter, permit the detection of additional position parameters between a position-control element relative to a reference body.

With the method according to the invention, this object is achieved.

Such position parameters include an additional coordinate direction and/or inclinations or angles of inclination around one or several coordinate axes. The invention is based on the consideration that it is possible through analysis of two angles of projection to determine the distance between a scanner location and the scale. Now, if such measurement of the distance is carried out in two different locations, it is possible to analyze an additional coordinate direction, taking into account the mutual alignment of the optical axes, and to deduce the inclination of the scale relative to a straight line extending through the two scanner locations, allowing for the mutual distance between the scanner locations.

Now, based on said consideration it is possible to determine any angle of inclination around a coordinate axis. If the angle around only one coordinate axis is to be analyzed, it suffices to determine on a scale arranged perpendicular to said coordinate axis the distances between the scale and two scanner locations. With angles of inclination in two coordinate directions, the distances between two scales and two scanner locations in each case are determined accordingly. It is possible also to expand the distance measurement in three coordinate directions; in this way, it is possible then to detect all three angles of inclination around the coordinate directions.

A simplified application makes provision that the graduations and angles of projection to be analyzed are determined by scanners with equally aligned optical axes. In this connection, said graduations and angles of projection can be analyzed by a total of two scanners that are both associated with the same scale.

In this way, it is possible to determine in addition to the coordinates of two coordinate axes also the angle of inclination around a third coordinate axis.

Another simplified application makes provision for analyzing the graduations disposed on an additional scale that is aligned parallel with the first scale. The graduations and angles of projection can be analyzed by a total of two scanners, of which each one is associated with a scale.

Said application makes it possible to determine both the coordinates of two coordinate axes and the angles of inclination around one of said coordinate axis and a third coordinate axis.

If another scanner is used additionally that is associated with one of said scales, it is possible to determine in addition to the coordinates of two coordinate axes the angles of inclination around all three coordinate axes.

In connection with a further embodiment with two scales as well, the latter are arranged with an angle of preferably 90 degrees. A scanner can be associated with each of said scales.

With said embodiment it is possible to determine only the coordinates of all three coordinate axes.

By associating an additional scanner with one of the scales it is possible to additionally determine the angle of inclination around one coordinate axis.

A further development makes provision that two scanners are associated with each scale.

In this way, the coordinates of all three coordinate axes and the angles of inclination around two coordinate axes can be determined.

A further improvement of the measuring possibilities is obtained if the graduations present on a second scale, the latter being aligned parallel with the first scale, and the graduations present on a third scale, the latter being aligned with the first scale with an angle of preferably 90 degrees, are analyzed.

For example, an arrangement with a total of three scanners, of which each one is associated with a scale, and of which the optical axes are disposed in one plane, offers the possibility to determine the coordinates of all coordinate directions and the angle of inclination around two coordinate axes.

By associating a fourth scanner with one of the parallel scales it is possible to determine not only the coordinates of all three coordinate axes but also the angles of inclination around all three coordinate axes.

With said embodiment, the position parameters can be determined as follows:

$$X_{01} = \frac{\Delta_1 * (Z1_1^2 - Z2_1^2)}{(Z1_1 - Z2_1)^2 + \Delta_1^2}$$

$$X_{03} = \frac{\Delta_3 * (Z1_3^2 - Z2_3^2)}{(Z1_3 - Z2_3)^2 + \Delta_3^2}$$

$$X_{05} = \frac{\Delta_5 * (Z1_5^2 - Z2_5^2)}{(Z1_5 - Z2_5)^2 + \Delta_5^2}$$

$$Y_{01} = \frac{\Delta_1^2 * (Z1_1 - Z2_1)}{(Z1_1 - Z2_1)^2 + \Delta_1^2}$$

$$Z_{03} = \frac{\Delta_3^2 * (Z1_3 - Z2_3)}{(Z1_3 - Z2_3)^2 + \Delta_3^2}$$

$$Z_{04} = \frac{\Delta_4^2 * (Z1_4 - Z2_4)}{(Z1_4 - Z2_4)^2 + \Delta_4^2}$$

$$Z_{05} = \frac{\Delta_5^2 * (Z1_5 - Z2_5)}{(Z1_5 - Z2_5)^2 + \Delta_5^2}$$

-continued $$f = \arctan \frac{Z_{04} - Z_{03}}{\delta_{43}}$$

$$æ = \arctan = \frac{X_{05} - X_{03}}{\delta_{53}}$$

$$\omega = \arctan \frac{Z_{05} - Z_{03}}{\delta_{53}}$$

whereby the indices 1, 3, denote the first, third, fourth and fifth scanner;

$$\text{whereby } Z1_{1...5} = \frac{\Delta_{1...5}}{2 * \tan \alpha_{1...5}}$$

$$\text{and } Z2_{1...5} = \frac{\Delta_{1...5}}{2 * \tan \beta_{1...5}}$$

α denotes the angle of projection between the scanner location as well as a first and a second graduation; β denotes the angle of projection between the scanner location and the first or second as well as a third graduation; Δis the spacing between two graduations; $X_{01} \ldots 5$, $Y_{01}$ and $Z_{03\ldots5}$ are the coordinates of the scanner locations of the scanners denoted by the indices relative to the scale; f represents the angle around the Y-axis, is the angle around the Z-axis, ω the angle around the X-axis; and δ forms the distance between the scanner locations of the scanners denoted by the indices.

A preferred embodiment makes provision that the graduations and angles of projection of a total of five scanners are analyzed, of which the first and second, the third and fourth as well as the third and fifth are equally aligned with their optical axes, and the first and second are aligned with their optical axes with an angle of preferably 90 degrees as against the third, fourth and fifth scanners, and of which scanners the ones having their optical axes aligned with an angle are disposed in one plane; and that a third scale is present that is aligned parallel with the first or with the second scale.

With said embodiment, a comprehensive determination of all coordinate directions and angles of inclination around all coordinate axes is achieved. In this way, it is possible to exactly determine the coordinate positions in the direction of all axes of a coordinate system even if longitudinal displacements are simultaneously superimposed by inclination movements.

With the last embodiment, the position parameters can be determined as follows:

$$X_{01} = \frac{\Delta_1 * (Z1_1^2 - Z2_1^2)}{(Z1_1 - Z2_1)^2 + \Delta_1^2}$$

$$Y_{01} = \frac{\Delta_1^2 * (Z1_1 - Z2_1)}{(Z1_1 - Z2_1)^2 + \Delta_1^2}$$

$$Y_{02} = \frac{\Delta_2^2 * (Z1_2 - Z2_2)}{(Z1_1 - Z2_2)^2 + \Delta_2^2}$$

$$Z_{03} = \frac{\Delta_3^2 * (Z1_3 - Z2_3)}{(Z1_3 - Z2_3)^2 + \Delta_3^2}$$

$$Z_{04} = \frac{\Delta_4^2 * (Z1_4 - Z2_4)}{(Z1_4 - Z2_4)^2 + \Delta_4^2}$$

$$Z_{05} = \frac{\Delta_5^2 * (Z1_5 - Z2_5)}{(Z1_5 - Z2_5)^2 + \Delta_5^2}$$

$$f = \arctan \frac{Z_{04} - Z_{03}}{\delta_{43}}$$

-continued $$æ = \arctan = \frac{Y_{02} - Y_{01}}{\delta_{21}}$$

$$\omega = \arctan \frac{Z_{05} - Z_{03}}{\delta_{53}}$$

whereby the indices 1, 2, 3, 4, 5 denotes the first, second third, fourth and fifth scanner;

$$\text{whereby } Z1_{1...5} = \frac{\Delta_{1...5}}{2 * \tan \alpha_{1...5}}$$

$$\text{and } Z2_{1...5} = \frac{\Delta_{1...5}}{2 * \tan \beta_{1...5}}$$

α denotes the angle of projection between the scanner location as well as a first-and a second graduation; β denotes the angle of projection between the scanner location and the first or second as well as a third graduation; Δ is the distance between two graduations; $X_{01}$, $Y_{01\ldots3}$ and $Z_{03\ldots5}$ are the coordinates of the scanner locations of the scanners denoted by the indices relative to the scale; f represents the angle around the Y-axis, æ the angle around the Z-axis, and ω the angle around the X-axis; and δ forms the spacing between the scanner locations of the scanners denoted by the indices.

Since two scanner locations can be disposed in each coordinate direction, it is possible to determine via the tangent function or inverse tangent function the difference of the distances from the scale and also the angles of inclination around the coordinate axis disposed perpendicular thereto in each case. With longitudinal displacements in one or several coordinate directions, the distances determined by each scanner for the same coordinate direction are the same, so that one can limit oneself in each case to the data of one scanner.

In a practical application, the angles of projection are obtained by optical representation of the graduations on a projection surface and measurement of the spacings of the projection locations. The projection center of a reproduction optics is selected as the scanner location.

In this way, it is possible to realize the required desired resolution of the angle with predetermined resolution of the measuring sensors on the projection surface by suitably selecting the spacing of the projection surface from the projection optics, as well as its focal length.

In said respect, the invention is based on the problem of creating a sensor which, in addition to measuring the position of a scale axis and perpendicular thereto, is capable of detecting additional position parameters between a position-control element relative to a reference body.

The explanations for the method are correspondingly applicable to the mode of operation and advantages of the embodiments of the sensor.

Further developments and advantageous embodiments of the method and sensor can be derived from the claims, the following description and the drawing, based on which the invention is described in greater detail.

Figure 1:
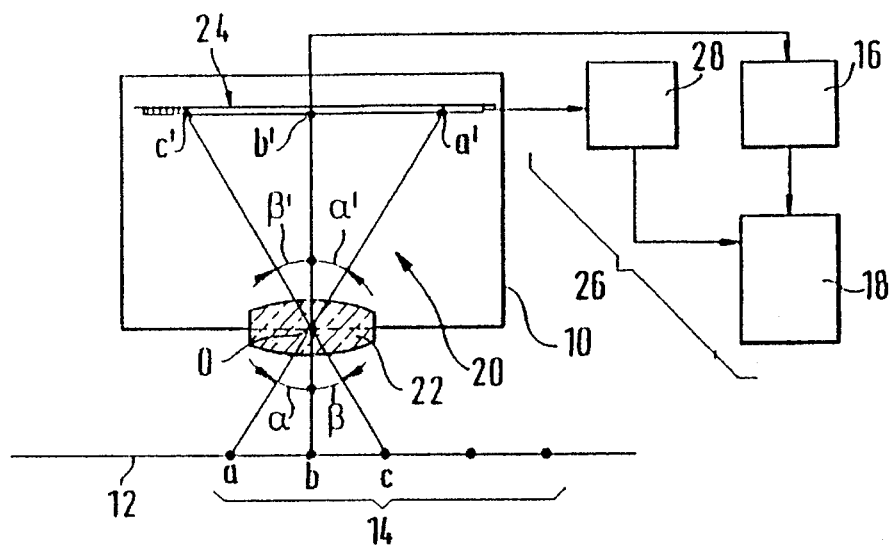
FIG. 1 shows a schematic lateral view of a scanner above a scale.

FIG. 1 shows a scanner in a schematic lateral view. Said scanner comprises a scale 12 with the graduations 14, of which individual graduations are denoted here by a, b and c. If the scale 12 is an incremental scale, the coordinates can be roughly determined in the longitudinal direction of the scale by counting the graduations 14. With another alternative, where an absolute scale is used, the graduations already contain by coding the complete rough coordinate information in the longitudinal direction of the scale. Such coding can be obtained, for example by different line widths, if necessary in combination with a binary mode of representation.

The scanner 10 is disposed above the scale 12 and decodes the length information encoded in the graduations 14. With the help of a angle-measuring device 20 it is possible to determine angles of projection arising between the graduations 14 and a location of the scanner 10.

The scanner 10 is designed as an optical scanner and comprises a reproduction optics 22 with a projection surface 24, as well as a distance-measuring device 26. With said scanner, a scanner location 0 is formed by the projection center of the reproduction optics 22 facing the scale. The projection surface 24 is formed by an array of diodes, for example in the form of a CCD-line. The number of picture elements is selected in such a way that in the case of an absolute scale, the graduations 14 can be resolved in their width and decoded with the help of a computer 18.

In the case of an incremental scale, a counter 16 serves for analyzing the values read by the scanner 10, which counter may also be integrated in a computer 18, as well as an additional counter 28, which may be integrated in the computer 18 as well. In this connection, the counter 16 serves for counting the events, thus the number of graduations that are passed when the scanner 10 is longitudinally displaced across the scale 12. A rough determination of the distance passed is thus possible with the help of said counter 16 and the computer 18, whereby in the present case, with an arrangement of the graduations 14 on the scale 12 with a spacing $\Delta$ of about 1 mm, the resolution, too, is only in this order of magnitude.

The interpolation between the graduations 14 is carried out by means of the angle-measuring device 20. The drawing shows that in the present case, for example, the graduations a, b and c, which assume the angle $\alpha$ or $\beta$ relative to the scanner location, are reproduced in points a', b' and c' of the projection surface 24 with the angles $\alpha'$ and $\beta'$.

There, the angle of projection is determined in each case by means of the distance-measuring device 26 via the distance measurement of the projection points a', b' and c' on the projection surface 24. If the distance/measuring device 26 has, for example one CCD-line, changes in charge are effected in the sites where the graduations are reproduced on said line. Following serial readout, said changes in charge are registered by the counter 28 and can be converted by the computer 18 into the corresponding angle values $\alpha$ and $\beta$.

Figure 2:
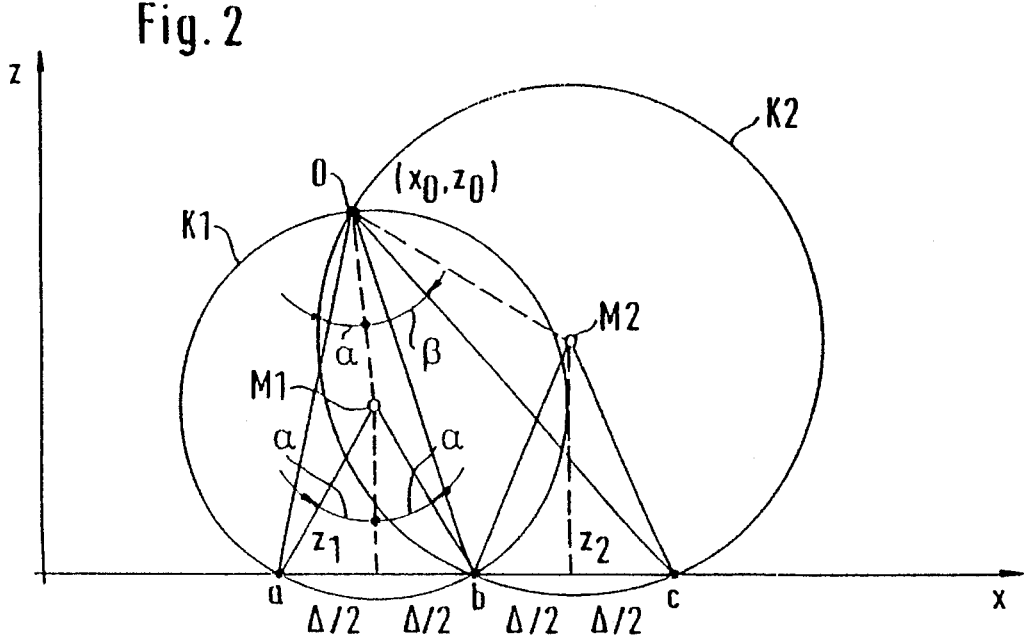
FIG. 2 is a geometric representation of the angles of projection for explaining the calculation formulas.

By using trigonometric functions, it is possible to determine on the basis of the projection angles $\alpha$ and $\beta$ the coordinates of the scanner location 0, which in the present case corresponds with the projection center in the reproduction optics 22. For explaining the calculation steps, reference is made to FIG. 2, in which only the graduations a, b and c and the scanner location 0 are taken from FIG. 1. In the present case, however, the scanner location 0 is not disposed directly above the graduation b in order to show also graphically that it is possible to determine any position of the scanner location 0.

The angle of projection $\alpha$ is enclosed between the scanner location 0 and the graduations a and b, and the angle of projection $\beta$ is enclosed between the scanner location 0 and the graduations b and c. The spacings of the graduations a, b and c amount to $\Delta$ in each case. Now, viewing the angles $\alpha$ and $\beta$ by themselves shows that there are various points assuming the same angle of projection $\alpha$ and $\beta$. Said points are located on a local curve which, for the angle $\alpha$, is represented by a circle K 1, and by a circle K 2 for the angle $\beta$. If one combines the two angles $\alpha$ and $\beta$, there is only one real point where the condition is satisfied. Said point is given by the points of intersection of the two local curves, thus of the circles K 1 and K 2.

The central points M 1 and M 2 of the circles K 1 and K 2 can be determined by determining the mid-verticals between the graduations a and b, on the one hand, and between b and c on the other hand, and obtaining in the present case the points of intersection with lines extending through the graduations a and b, and b and c with the angle of projection, thus $\alpha$ and $\beta$, respectively, in each case.

For the spacings of the central points M 1 and M 2 from the axis of the scale, thus the Z-coordinate of the central points M 1 and M 2, the following follows:

$$Z1 = \frac{\Delta}{2*\tan\alpha} \text{ and } Z2 = \frac{\Delta}{2*\tan\beta}$$

Through mathematical derivations there follows for $$X_0 = \frac{\Delta*(Z1^2 - Z2^2)}{(Z1-Z2)^2 + \Delta^2}$$

and for $$Z_0 = \frac{\Delta^2*(Z1+Z2)}{(Z1-Z2)^2 + \Delta^2}$$

Said equations thus lead to a clear solution and can be determined with common computers within the shortest of time. They apply to all scanners A 1 to A 5. So as to be able to subsequently obtain a reference to the respective scanner, the quantities in the equations are additionally provided with indices conforming to the ordinal number of the scanners; with five scanners, consequently the indices ], 2, 3, 4 and 5 are assigned.

Figure 3:
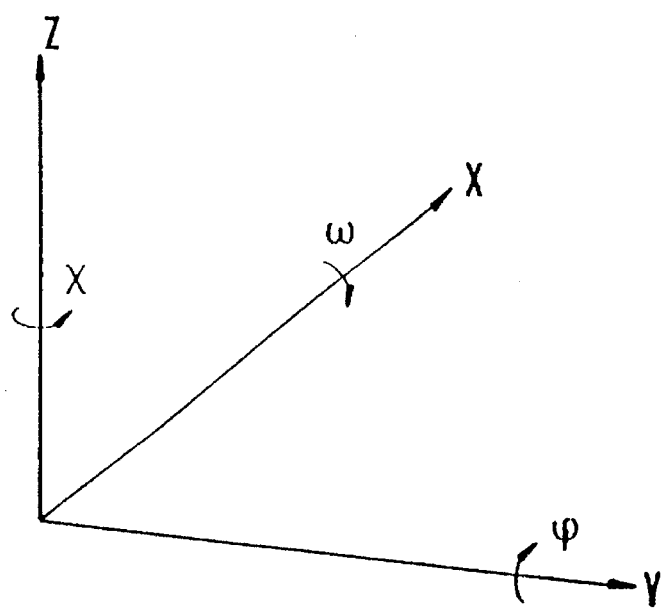
FIG. 3 shows a coordinate system for defining the designations and parameters used.

FIG. 3 shows a system of coordinates for defining the designations and parameters used. The parameters defined here are used also in FIGS. 4 and 5. This is a Cartesian system of coordinates with the coordinate axes X, Y and Z. f denotes the angle around the Y-axis, æ the angle around the Z-axis, and $\omega$ the angle around the X-axis.

Figure 4:
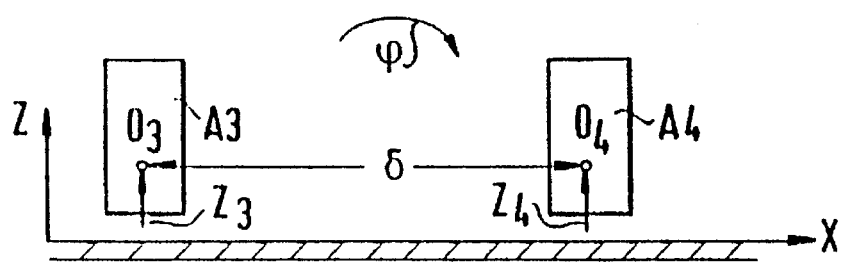
FIG. 4 is a schematic lateral view of two scanners above a scale.

FIG. 4 shows a schematic lateral view of the two scanners A 3, A 4 above a scale 32. The scanner locations $0_3$ and $0_4$ have a mutual distance $\delta$. If a straight line leading through the scanner locations extends parallel with the scale 32, the two spacings of the scanner locations are the same as well. In case of deviations, the angle can be calculated via the tangent or inverse tangent function in association with the spacing $\delta$, namely according to the general formula:

$$\text{angle of inclination} = \arctan \frac{Z_{04} - Z_{03}}{\delta}$$

Said formula, too, can be applied to all pairs of scanners having the same alignment of their optical axes. So as to be able to obtain a reference to the respective scanner in this case as well, the quantities in the equations are additionally provided with indices conforming to the ordinal number of the scanners; with five scanners A 1 to A 5, consequently the indices 1, 2, 3, 4 and 5 are assigned. At spacing β, the indices denote the scanner locations of the participating scanners of the pair of scanners to which the spacing relates.

Figure 5:
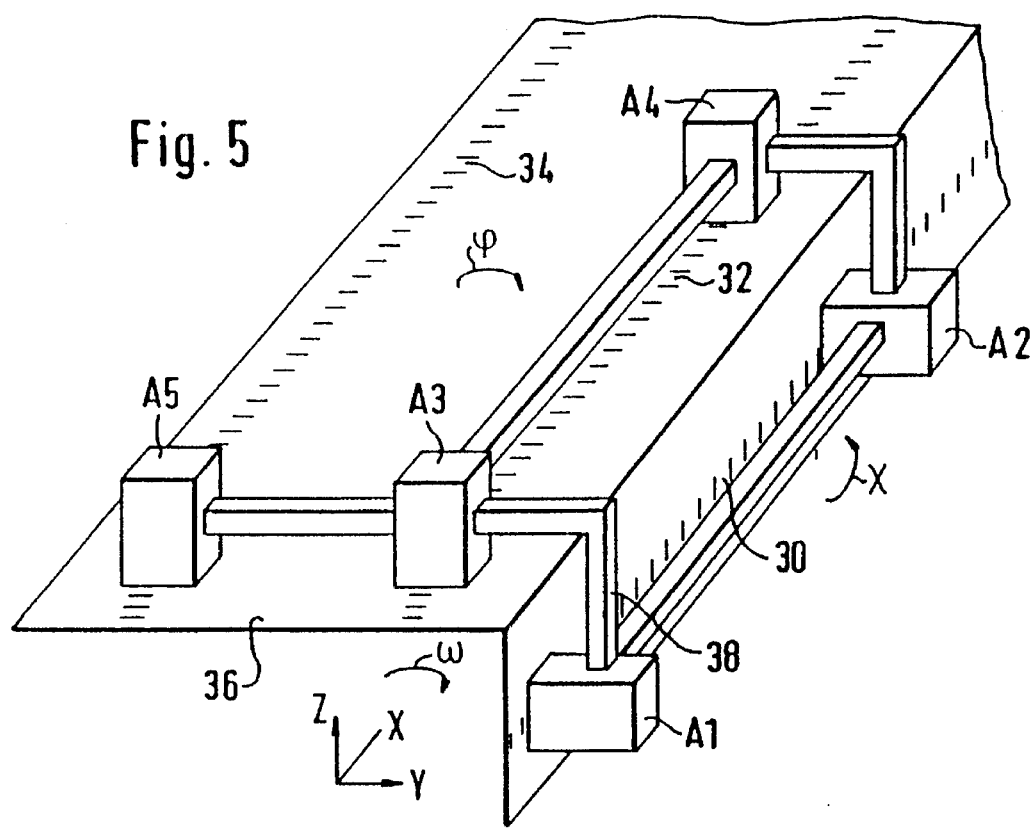
FIG. 5 is a perspective view of a position-control element with scales and scanners for detecting all spatial parameters.

FIG. 5 shows a position-control element 36 with the three scales 30, 32, 34, and the five scanners A 1, A 2, A 3, A 4, A 5, on a reference body 38. A first scale 30 is present on the narrow side of the reference body 38. A second scale 32 and a third scale 34 are arranged on the broad side of the reference body 38. The narrow side and the broad side of the reference body 38 are aligned with an angle of 90 degrees. A first scanner A 1 and a second scanner A 2 are arranged above the first scale 30, said scanners being equally aligned with their optical axes and scanning different ranges of the first scale 30. A third scanner A 3 and a fourth scanner A 4 are disposed above the second scale 32, said scanner being equally aligned with their optical axes as well and scanning different ranges of the second scale 32. A fifth scanner A 5, which with its optical axis is equally aligned with the third scanner A 3 and the fourth scanner A 4, is disposed above the third scale 34. The first scanner A 1 and the second scanner A 2 and the third, fourth and fifth scanners A 3, A 4 and A 5 jointly enclose an angle of 90 degrees, whereby the first scanner A 1, the third scanner A 3 and the fifth scanner A 5 are disposed in one plane, on the one hand, and the second scanner A 2 and the fourth scanner A 4 are disposed in one plane, on the other hand.

The exact position of the position-control element 36 vis-a-vis the reference body 38 can now be determined on the basis of the scanning values found by the scanners. Basically, the data of each of the five scanners are suitable for the determination of the X-direction. Said data correspond with respect to the X-direction, so that the result of any scanner can be used. In the present case, the scanners A 1, A 3 and A 5 are analyzed. In connection with the alternatives described hereinafter, the values of all of said scanners A 1, A 3 and A 5 are required, on the one hand, and only the values of the scanner A 1 on the other hand. The X-coordinates are then obtained according to the following formula:

$$X_{01} = \frac{\Delta_1 * (Z1_1^2 - Z2_1^2)}{(Z1_1 - Z2_1)^2 + \Delta_1^2}$$

$$X_{03} = \frac{\Delta_3 * (Z1_3^2 - Z2_3^2)}{(Z1_3 - Z2_3)^2 + \Delta_3^2}$$

$$X_{05} = \frac{\Delta_5 * (Z1_5^2 - Z2_5^2)}{(Z1_5 - Z2_5)^2 + \Delta_5^2}$$

The data of the scanners A 1 and A 2 are suitable for the determination of the Y-direction. Of the position-control element 36 and the reference body 38 are aligned in parallel, the data of the two scanners A 1 and A 2 supply the same value. However, with inclinations around the Z-axis, the values are different. The Y-coordinates are obtained according to the following formula:

$$Y_{01} = \frac{\Delta_1^2 * (Z1_1 - Z2_1)}{(Z1_1 - Z2_1)^2 + \Delta_1^2}$$

$$Y_{02} = \frac{\Delta_2^2 * (Z1_2 - Z2_2)}{(Z1_2 - Z2_2)^2 + \Delta_2^2}$$

The data of the scanners A 3, A 4 and A 5 are suitable for the determination of the Z-direction. If the position-control element 36 and the reference body 38 are aligned in parallel and also not turned around the X-axis, the data of the three scanners A 3, A 4 and A 5 supply the same value. However, the values are different in the presence of inclinations around the Y-axis and/or the X-axis. The Z-coordinates are obtained according to the following formula:

$$Z_{03} = \frac{\Delta_3^2 * (Z1_3 - Z2_3)}{(Z1_3 - Z2_3)^2 + \Delta_3^2}$$

$$Z_{04} = \frac{\Delta_4^2 * (Z1_4 - Z2_4)}{(Z1_4 - Z2_4)^2 + \Delta_4^2}$$

$$Z_{05} = \frac{\Delta_5^2 * (Z1_5 - Z2_5)}{(Z1_5 - Z2_5)^2 + \Delta_5^2}$$

The angles of inclination can be calculated based on the calculated coordinates as well. The definitions established in connection with FIG. 3 apply to the position of the angles. The angles are then obtained according to the following formulas:

$$f = \arctan \frac{Z_{04} - Z_{03}}{\delta_{43}}$$

$$\mathfrak{x} = \arctan \frac{Y_{02} - Y_{01}}{\delta_{21}}$$

Or also according to:

$$\mathfrak{x} = \arctan \frac{X_{05} - X_{03}}{\delta_{53}}$$

$$\omega = \arctan \frac{Z_{05} - Z_{03}}{\delta_{53}}$$

Figure 6:
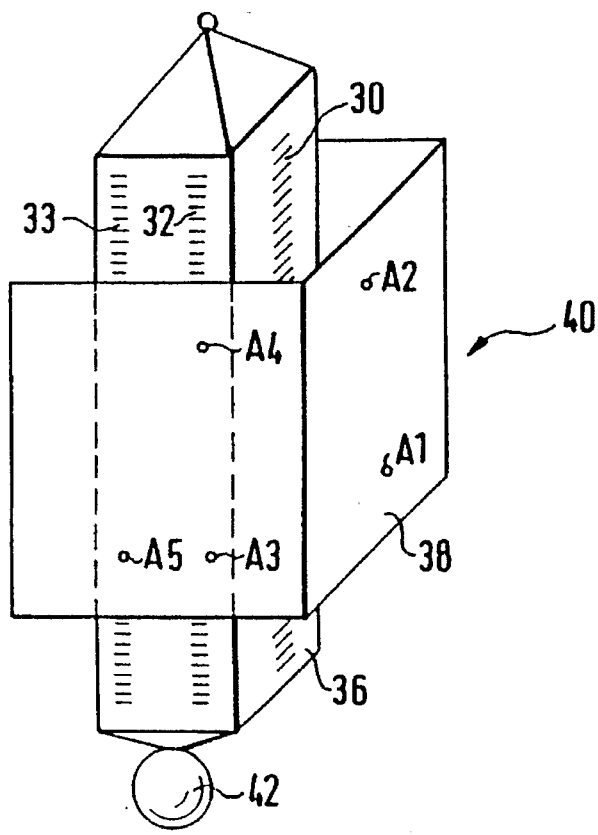
FIG. 6 shows a probe for scanning contours as an example of application of the invention.

Finally, FIG. 6 shows an example of application of the invention. Involved is a probe 40 for scanning contours. The probe 40 comprises a reference body 38 forming the casing of the probe 40 and supporting the optical scanners A 1 to A 5. A position-control element 36 is located within the reference body 38. Said position-control element is provided with the scales 30, 32, 34 and, at one end, swingably, displaceably and rotatably clamped in the reference body 38, and supports at the other end a scanning ball 42 which, in measuring operations, slides along the test surface and, in doing so, encounters deflections and/or compressive strains. Based on such deflections and/or compressive strains it is then possible, with application of the above formulas, to determine a number of measured values that permit a reproduction of the contour of the surface.

I claim:

1. Method for the determination of the position of a position-control element relative to a reference body, comprising providing a position-control element carrying a first scale with at least three graduations placed at constant intervals and the reference body having a first scanner which, via an analysis of the graduations and via the angles of projection between a first scanner location and said at least three graduations arranged on the scale for calculating the coordinates of the first scanner location according to trigonometric functions;

calculating the coordinates of the scanner location of at least one additional scanner, said at least one additional scanner being arranged with a spacing from the first scanner;

picturing the graduations of constant spacings on the scanners, said coordinates of the first, second and each additional scanner location being the coordinate in the direction of the axis of the scale as well as the coordinate perpendicular to the direction of the axis of the scanners, and in the coordinates of the common analysis of the scanner locations, angles of inclination are also included; and jointly analyzing all coordinates of the scanner locations of the scanner, taking into account their spacings.

2. Method according to claim 1, comprising determining the graduations and angles of projections to be analyzed by said first, second and additional scanners with equally aligned optical axes.

3. Method according to claim 2, comprising analyzing the graduations and angle of projection by a total of two scanners, said two scanners being associated with the same scale.

4. (Amended) Method according to claim 1, comprising analyzing the graduations present on an additional scale, said additional scale being aligned parallel with the first scale.

5. Method according to claim 4, comprising analyzing the graduations and angles of projection by a total of two scanners, of which each scanner is associated with one of said scale.

6. Method according to claim 4, comprising analyzing the graduations and angles of projection by a total of three scanners, of which two scanners are associated with said first scale and the third scanner is associated with said second scale.

7. Method according to claim 1, comprising determining the graduations and angles of projection by scanners with optical axes aligned with an angle of 90 degrees; and analyzing the graduations present on an additional scale, the additional scale being aligned with an angle of 90 degrees relative to the first scale.

8. Method according to claim 7, comprising analyzing the graduations and angles of projection to be analyzed by a total of two scanners, of which each scanner is associated with one of said scales.

9. Method according to claim 7, comprising analyzing the graduations and angles of projection to be analyzed by a total of three scanners, of which two scanners are associated with said first scale and the third scanner is associated with said second scale.

10. Method according to claim 7, comprising analyzing the graduations and angles of projection to be analyzed by a total of four scanners, of which two scanners are associated with the first scale and two other scanners are associated with the second scale.

11. Method according to claim 1, comprising analyzing the graduations present on a second scale, the second scale being aligned parallel with the first scale, and the graduations present on a third scale, the third scale being aligned with the first scale with an angle of 90 degrees.

12. Method according to claim 11, comprising analyzing the graduations and angles of projection to be analyzed by a total of three scanners, of which each scanner is associated with a scale and of which the optical axes are disposed in one plane.

13. Method according to claim 11, comprising analyzing the graduations and angles of projection to be analyzed by a total of four scanners, of which two scanners are associated with one of two parallel scales and the third scanner is associated with the other parallel scale, and the fourth scanner is associated with the third scale aligned 90 degrees with the first scale.

14. Method for the determination of the position of a position-control element relative to a reference body, comprising providing a position-control element carrying a first scale with at least three graduations placed at constant intervals and the reference body having a first scanner which, via an analysis of the graduations and via the angles of projection between a first scanner location and at least three graduations arranged on the scale for calculating the coordinates of the first scanner location according to trigonometric functions;

calculating the coordinates of the scanner location of at least one additional scanner, said additional scanner being arranged with a spacing from the first scanner;

jointly analyzing all coordinates of the scanner locations of the scanners; taking into account their spacings;

analyzing the graduations present on a second scale, the latter being aligned parallel with the first scale, and the graduations present on a third scale, the latter being aligned with the first scale with an angle of 90 degrees;

carrying out the calculation with five scanners according to the following trigonometric functions or equations:

$$X_{01} = \frac{\Delta_1 * (Z1_1^2 - Z2_1^2)}{(Z1_1 - Z2_1)^2 + \Delta_1^2}$$

$$X_{03} = \frac{\Delta_3 * (Z1_3^2 - Z2_3^2)}{(Z1_3 - Z2_3)^2 + \Delta_3^2}$$

$$X_{05} = \frac{\Delta_5 * (Z1_5^2 - Z2_5^2)}{(Z1_5 - Z2_5)^2 + \Delta_5^2}$$

$$Y_{01} = \frac{\Delta_1^2 * (Z1_1 + Z2_1)}{(Z1_1 - Z2_1)^2 + \Delta_1^2}$$

$$Z_{03} = \frac{\Delta_3^2 * (Z1_3 + Z2_3)}{(Z1_3 - Z2_3)^2 + \Delta_3^2}$$

$$Z_{04} = \frac{\Delta_4^2 * (Z1_4 + Z2_4)}{(Z1_4 - Z2_4)^2 + \Delta_4^2}$$

$$Z_{05} = \frac{\Delta_5^2 * (Z1_5 + Z2_5)}{(Z1_5 - Z2_5)^2 + \Delta_5^2}$$

$$f = \arctan \frac{Z_{04} - Z_{03}}{\delta_{43}}$$

$$ae = \arctan \frac{X_{05} - X_{03}}{\delta_{53}}$$

$$\omega = \arctan \frac{Z_{05} - Z_{03}}{\delta_{53}}$$

whereby the indices 1, 3, 4, 5 denote the first, third, fourth and fifth scanner;

$$\text{whereby } Z1_{1\ldots5} = \frac{\Delta_{1\ldots5}}{2*\tan\alpha_{1\ldots5}} ;$$

$$\text{and } Z2_{1\ldots5} = \frac{\Delta_{1\ldots5}}{2*\tan\beta_{1\ldots5}} ;$$

where $\alpha$ denotes the angle of projection between the scanner location as well as a first and a second graduation; $\beta$ denotes the angle of projection between the scanner location and the first or second as well as a third graduation; $\Delta$ is the distance between two graduations; $X_{01\ldots5}$, $Y_{01}$ and $Z_{03\ldots5}$ are the coordinates of the scanner locations of the scanners denoted by the indices relative to the scale; f represents the angle around the Y-axis, æ the angle around the Z-axis, and $\omega$ the angle around the X-axis, and $\delta$ forms the spacing between the scanner locations of the scanners denoted by the indices.

15. Method according to claim 14, comprising analyzing the graduations and angles of projection to be analyzed by a total of five scanners, of which the first scanner and second scanner, the third scanner and fourth scanner as well as the third and fifth scanners are equally aligned with their optical axes, and the first and the second scanners are aligned with their optical axes with an angle of 90 degrees as against the third, fourth and fifth scanners, and of which the scanners having their optical axes aligned with an angle are disposed in one plane; and that provision is made for a third scale, the latter being aligned parallel with the first scale or the second scale.

16. Method according to claim 15, characterized in that the calculation is carried out according to the following trigonometric functions or equations:

$$X_{01} = \frac{\Delta_1 * (Z1_1^2 - Z2_1^2)}{(Z1_1 - Z2_1)^2 + \Delta_1^2}$$

$$Y_{01} = \frac{\Delta_1^2 * (Z1_1 + Z2_1)}{(Z1_1 - Z2_1)^2 + \Delta_1^2}$$

$$Y_{02} = \frac{\Delta_2^2 * (Z1_2 + Z2_2)}{(Z1_2 - Z2_2)^2 + \Delta_2^2}$$

$$Z_{03} = \frac{\Delta_3^2 * (Z1_3 + Z2_3)}{(Z1_3 - Z2_3)^2 + \Delta_3^2}$$

$$Z_{04} = \frac{\Delta_4^2 * (Z1_4 + Z2_4)}{(Z1_4 - Z2_4)^2 + \Delta_4^2}$$

$$Z_{05} = \frac{\Delta_5^2 * (Z1_5 + Z2_5)}{(Z1_5 - Z2_5)^2 + \Delta_5^2}$$

$$f = \arctan \frac{Z_{04} - Z_{03}}{\delta_{43}}$$

$$ae = \arctan \frac{Y_{02} - Y_{01}}{\delta_{21}}$$

$$\omega = \arctan \frac{Z_{05} - Z_{03}}{\delta_{53}}$$

whereby the indices 1, 2, 3, 4, 5 denote the first scanner, second scanner, third scanner, fourth scanner and fifth scanner;

$$\text{whereby } Z1_{1\ldots5} = \frac{\Delta_{1\ldots5}}{2*\tan\alpha_{1\ldots5}} ;$$

$$\text{and } Z2_{1\ldots5} = \frac{\Delta_{1\ldots5}}{2*\tan\beta_{1\ldots5}} ;$$

where $\alpha$ denotes the angle of projection between the scanner location as well as a first and a second graduation; $\beta$ denotes the angle of projection between the scanner location and the first or second as well as a third graduation; $\Delta$ is the distance between two graduations; $X_{01}$, $Y_{01\ldots3}$ and $Z_{03\ldots5}$ are the coordinates of the scanner locations of the scanners denoted by the indicates relative to the scale; f represents the angle around the Y-axis, m the angle around the Z-axis, and $\omega$ the angle around the X-axis, and 6 forms the spacing between the scanner locations of the scanners denoted by the indices.

17. Method according to claim 14, comprising obtaining the angles of projection by optical reproduction of the graduations on a projection surface and measurement of the spacing of the projection sites, and that the projection center of a reproduction optics is selected as the scanner location.

18. Sensor for the determination of the position of a position-control element relative to a reference body comprising a position-control element carrying a first scale with graduations with constant spacings and the reference body having a first scanner connected with a computer;

said scanner comprising an angle-measuring device by means of which the angles of projection ($\alpha$, $\beta$) between a scanner location and at least three graduations arranged on the scale are determined;

said computer being controlled in such a way that it calculates the coordinates of the scanner location via an analysis of the graduations and via the angles of projection ($\alpha$, $\beta$) according to trigonometric functions;

said reference body having at least one additional scanner arranged with a spacing ($\delta$) from the first scanner and the computer being controlled in a way such that all coordinates of the scanner locations of said at least two scanners are calculated and jointly analyzed, taking into account their spacings ($\delta$); and said graduations of constant spacings being pictured on the scanners, said coordinates of the first, second and each additional scanner location are the coordinate in the direction of the axis of the scale as well as the coordinate perpendicular to the direction of the axis of the scanners, and in the coordinates of the common analysis of the scanner locations, angles of inclination are also included.

19. Sensor according to claim 18, wherein said at least two scanners are equally aligned with their optical axes.

20. Sensor according to claim 18, wherein a total of two scanners is present, said two scanners are both associated with the same scale.

21. Sensor according to claim 18, wherein there are two parallel scales.

22. Sensor according to claim 21, wherein a total of two scanners is present, of which each scanner is associated with a different one of the two scales.

23. Sensor according to claim 21, wherein a total of three scanners is present, of which two are associated with said one scale and the other is associated with said additional scale.

24. Sensor according to claim 18, wherein the scanners are aligned with their optical axes with an angle of 90 degrees, and provision is made for an additional scale, said additional scale being aligned relative to the first scale with an angle of 90 degrees.

25. Sensor according to claim 24, wherein a total of two scanners is present, of which each one is associated with a different scale.

26. Sensor according to claim 24, wherein a total of three scanners is present, of which two scanners are associated with the one scale and one scanner is associated with the other scale.

27. Sensor according to claim 24, wherein a total of four scanners is present, of which two are associated with the one scale and two additional ones are associated with the other scale.

28. Sensor according to claim 18, wherein two parallel scales and one scale aligned with an angle of 90 degrees relative to the parallel scales are present.

29. Sensor according to claim 28, wherein a total of three scanners is present, of which each scanner is associated with a scale.

30. Sensor according to claim 28, wherein a total of four scanners is present, of which two scanners are associated with one of the parallel scales and a third scanner is associated with the other parallel scale and a fourth scanner is associated with the scale at the angle of 90 degrees.

31. Sensor for the determination of the position of a position-control element relative to a reference body, comprising a position-control element carrying a first scale with at least three graduations with constant spacings and the reference body having a first scanner connected with a computer;

said scanner comprising an angle-measuring device by means of which the angles of projection between a scanner location and said at least three graduations arranged on the scale are determined;

said computer being controlled in such a way that it calculates the coordinates of the scanner location via an analysis of the graduations and via the angles of projection according to trigonometric functions;

said reference body having at least one additional scanner being arranged with a spacing from the first scanner and the computer being controlled in a way such that all coordinates of the scanner locations of said at least two scanners are calculated and jointly analyzed, taking into account their spacings;

wherein two parallel scales and one scale aligned with an angle of 90 degrees relative to the parallel scales are present;

wherein the computer processes as trigonometric functions or equations the following functions or equations:

$$X_{01} = \frac{\Delta_1 * (Z1_1^2 - Z2_1^2)}{(Z1_1 - Z2_1)^2 + \Delta_1^2}$$

$$X_{03} = \frac{\Delta_3 * (Z1_3^2 - Z2_3^2)}{(Z1_3 - Z2_3)^2 + \Delta_3^2}$$

$$X_{05} = \frac{\Delta_5 * (Z1_5^2 - Z2_5^2)}{(Z1_5 - Z2_5)^2 + \Delta_5^2}$$

$$Y_{01} = \frac{\Delta_1^2 * (Z1_1 - Z2_1)}{(Z1_1 - Z2_1)^2 + \Delta_1^2}$$

$$Z_{03} = \frac{\Delta_3^2 * (Z1_3 - Z2_3)}{(Z1_3 - Z2_3)^2 + \Delta_3^2}$$

$$Z_{04} = \frac{\Delta_4^2 * (Z1_4 - Z2_4)}{(Z1_4 - Z2_4)^2 + \Delta_4^2}$$

$$Z_{05} = \frac{\Delta_5^2 * (Z1_5 - Z2_5)}{(Z1_5 - Z2_5)^2 + \Delta_5^2}$$

$$f = \arctan \frac{Z_{04} - Z_{03}}{\delta_{43}}$$

$$æ = \arctan = \frac{X_{05} - X_{03}}{\delta_{53}}$$

$$\omega = \arctan \frac{Z_{05} - Z_{03}}{\delta_{53}}$$

whereby the indices 1, 3, 4, 5 denote the first, third, fourth and fifth scanner;

$$\text{whereby } Z1_{1\ldots5} = \frac{\Delta_{1\ldots5}}{2 * \tan\alpha_{1\ldots5}}$$

$$\text{and } Z2_{1\ldots5} = \frac{\Delta_{1\ldots5}}{2 * \tan\beta_{1\ldots5}} ;$$

where $\alpha$ denotes the angle of projection between the scanner location as well as a first and a second graduation; $\beta$ denotes the angle of projection between the scanner location and the first or second as well as a third graduation; $\Delta$ is the spacing between two graduations; $X_{01\ldots5}$, $Y_{01}$ and $Z_{03\ldots5}$ are the coordinates of the scanner locations of the scanners denoted by the indices relative to the scale; f represents the angle around the Y-axis, æ the angle around the Z-axis, and $\omega$ the angle around the X-axis, and $\delta$ forms the spacing between the scanner locations of the scanners denoted by the indices.

32. Sensor according to claim 31, wherein there are a total of five scanners, of which the first scanner and the second scanner, the third scanner and the fourth scanner, as well as the third scanner and the fifth scanner, are equally aligned with their optical axes, and the first scanner and the second scanner are aligned with their optical axes with an angle of 90 degrees as against the third scanner, the fourth scanner and the fifth scanner, and that the scanners having their optical axes aligned with an angle each are disposed in one plane.

33. Sensor according to claim 32, wherein the computer processes as trigonometric functions or equations the following functions or equations:

$$X_{01} = \frac{\Delta_1 * (Z1_1^2 - Z2_1^2)}{(Z1_1 - Z2_1)^2 + \Delta_1^2}$$

$$Y_{01} = \frac{\Delta_1^2 * (Z1_1 - Z2_1)}{(Z1_1 - Z2_1)^2 + \Delta_1^2}$$

-continued $$Y_{02} = \frac{\Delta_2^2 * (Z1_2 - Z2_2)}{(Z1_2 - Z2_2)^2 + \Delta_2^2}$$

$$Z_{03} = \frac{\Delta_3^2 * (Z1_3 - Z2_3)}{(Z1_3 - Z2_3)^2 + \Delta_3^2}$$

$$Z_{04} = \frac{\Delta_4^2 * (Z1_4 - Z2_4)}{(Z1_4 - Z2_4)^2 + \Delta_4^2}$$

$$Z_{05} = \frac{\Delta_5^2 * (Z1_5 - Z2_5)}{(Z1_5 - Z2_5)^2 + \Delta_5^2}$$

$$f = \arctan \frac{Z_{04} - Z_{03}}{\delta_{43}}$$

$$æ = \arctan = \frac{Y_{02} - Y_{01}}{\delta_{21}}$$

$$\omega = \arctan \frac{Z_{05} - Z_{03}}{\delta_{53}}$$

whereby the indices 1, 2, 3, 4, 5 denote the first scanner, second scanner, third scanner, fourth scanner and fifth scanner;

whereby $Z1_{1\ldots5} = \frac{\Delta_{1\ldots5}}{2 * \tan\alpha_{1\ldots5}}$

-continued and $Z2_{1\ldots5} = \frac{\Delta_{1\ldots5}}{2 * \tan\beta_{1\ldots5}}$ ;

where $\alpha$ denotes the angle of projection between the scanner location as well as a first and a second graduation; $\beta$ denotes the angle of projection between the scanner location and the first or second as well as a third graduation; $\Delta$ is the spacing between two graduations; $X_{01}$, $Y_{01}$ and $Z_{03\ldots5}$ are the coordinates of the scanner locations of the scanners denoted by the indices relative to the scale; f represents the angle around the Y-axis, æ the angle around the Z-axis, and $\omega$ the angle around the X-axis, and $\delta$ forms the spacing between the scanner locations of the scanners denoted by the indices.

34. Sensor according to claim 31,
wherein the scanners are optical scanners each comprising a reproduction optics with a projection surface and a distance-measuring device, whereby the scanner locations are formed by the projection centers of the reproduction optics.

35. Sensor according to claim 34,
wherein the projection surface and the distance-measuring device are formed by an array of diodes comprising a CCD-line.

\* \* \* \* \*